(12) United States Patent
Vitins et al.

(10) Patent No.: US 6,667,131 B1
(45) Date of Patent: Dec. 23, 2003

(54) ELECTROCHEMICAL CELL

(75) Inventors: Girts Vitins, Riga (LV); Keld West, Hellerup (DK); Rene Koksbang, Odense S (DK)

(73) Assignee: Danionics A/S, Odense S (DK)

( * ) Notice: Subject to any disclaimer, the term of this patent is extended or adjusted under 35 U.S.C. 154(b) by 0 days.

(21) Appl. No.: 09/700,128

(22) PCT Filed: May 7, 1999

(86) PCT No.: PCT/EP99/03246

§ 371 (c)(1), (2), (4) Date: Jan. 5, 2001

(87) PCT Pub. No.: WO99/59214

PCT Pub. Date: Nov. 18, 1999

(30) Foreign Application Priority Data

May 8, 1998 (GB) .............................. 9809964

(51) Int. Cl.$^7$ ............................... H01M 4/58
(52) U.S. Cl. ............... 429/231.1; 429/231.3; 429/224; 429/231.8; 429/231.4; 429/330; 429/331; 429/332; 429/337; 429/338
(58) Field of Search ............ 429/231.1, 231.3, 429/224, 231.8, 231.4, 330, 331, 332, 337, 338

(56) References Cited

U.S. PATENT DOCUMENTS

| 4,507,371 A | 3/1985 | Thackeray et al. ......... 429/191 |
| 5,084,366 A | 1/1992 | Toyoguchi .................. 429/224 |
| 5,240,794 A | 8/1993 | Thackeray et al. ......... 429/224 |
| 5,266,299 A | 11/1993 | Tarascon .................... 423/599 |
| 5,370,710 A | 12/1994 | Nagaura et al. ............ 29/623.1 |
| 5,506,078 A | 4/1996 | Davidson et al. ............ 429/224 |
| 5,789,112 A * | 8/1998 | Ellgen ........................ 429/223 |

FOREIGN PATENT DOCUMENTS

| EP | 0778629 A | 6/1997 |
| FR | 2733632 A | 10/1996 |
| JP | 10302766 | 11/1998 |
| WO | 99/00329 | 1/1999 ........... C01G/45/00 |

OTHER PUBLICATIONS

Sanchez, Luis et al., J. Electrochem. Soc., vol. 144, No. 6, Jun. 1997, pp. 1939–1943.
Guohua, Li et al., J. Electrochem. Soc., vol. 143, No. 1, Jan. 1996, pp. 178–182.
Liu, W. et al., J. Electrochem. Soc., vol. 143, No. 3, Mar. 1996, pp. 879–884.
Stoyanova, R. et al., Solid State Ionics, vol. 73 (1994), pp. 233–240.

* cited by examiner

Primary Examiner—Laura Weiner
(74) Attorney, Agent, or Firm—Darby & Darby

(57) ABSTRACT

The invention relates to a rechargeable electrochemical cell comprising a negative electrode, an electrolyte and a positive electrode in which the positive electrode structure comprises a lithium cobalt manganese oxide of the composition $Li_2Co_yMn_{2-y}O_4$ where $0<y<0.6$. The lithium cobalt manganese oxide of the above formula can be the only active compound or can be used together with one or more other rechargeable compounds. The lithium cobalt manganese oxide of the above formula may be in air and moisture insensitive tetragonal form and provides additional active lithium to compensate for capacity losses in lithium ion cells and lithium-alloy cells.

38 Claims, 1 Drawing Sheet

ELECTROCHEMICAL CELL

FIELD OF THE INVENTION

This invention relates to rechargeable electrochemical cells.

BACKGROUND OF THE INVENTION

The use of non-aqueous electrolytes has allowed the development of high voltage lithium-based electrochemical cells for energy storage. Such cells are further characterised in that their electrodes may be intercalation compounds. The positive electrode structures may be based on transition metal oxides operating at a potential close to 4V vs. $Li/Li^+$. Negative electrode structures of carbons and graphites may be applied, which reversibly intercalate lithium at a potential close to the potential of metallic lithium. Such cells are referred to as lithium-ion cells, as the active lithium is always in its ionic form. Alternatively, alloy negative electrode structures like Li-Al and Li-Sn may be used. Such cells will be referred to as lithium-alloy cells. All of the above configurations provide voltages close to 4V.

For the cells referred to above, one of the limiting factors in terms of energy density has been a low initial capacity retention. In operation, a capacity loss during initial charging of the cells is observed, as is a fading capacity upon extended cycling or storage, which in combination define the initial capacity retention.

These capacity reduction phenomena can be ascribed to the instability of the electrolyte towards the electrodes. Instability towards the negative electrode leads to gassing and formation of a passivating film, whereas instability against the positive electrode leads to corrosion of the electrode structure. Both phenomena involve electrolyte decompositon and result in loss of active lithium and a fading capacity of the cell.

In lithium-ion cells, the losses from the anode reactions dominate the losses at the cathode. The magnitude of the losses merely depends on the type of carbon(s)/graphite(s), the electrolyte and their combination. Using carbon-based anodes, active lithium corresponding to 30–50% of the amount of active lithium in the cell may be lost during the first charge-discharge cycles of the cell, i.e. during the initial charging and the young life of the cell. The use of graphites permits somewhat lower losses in the range 5–30%, however, with poorer long term capacity retention.

In the lithium-ion cell active lithium is provided solely via the cathode. Although prelithiation of carbon/graphite anode structures has been investigated, traditionally lithium-free carbon/graphite structures are applied. Compared to cells based on pure metallic lithium, the loss of active material is quite detrimental. Whereas metallic lithium can be added at 3,800 mAh/g, the specific capacities of the cathode materials are significantly lower.

Currently, active cathode materials are generally selected from $LiMn_2O_4$, $LiCoO_2$, $LiNiO_2$, $LiNi_xCo_{1-x}O_2$, $0<x<1$, these materials having capacities in the range 120–160 mAh/g. Therefore, simply providing additional cathode material to compensate for any loss of active material is relatively inefficient and may reduce the lithium-ion cell capacity and energy density significantly.

Losses also occur in the lithium-alloy cells and in such cells the lithium alloys are generally formed in-situ as this prevents the difficult handling of low potential lithium compounds, e.g. under inert conditions. In such cells active lithium is provided solely via the cathode.

In one type of alloy cell the base material is provided as an oxide. In the case of tin, the reaction scheme is:

$$4Li+SnO_2 \rightarrow 2Li_2O+Sn$$

$$4.4Li+Sn \rightarrow Li_{4.4}Sn$$

The scheme clearly shows the irreversible loss of lithium as lithium oxide which can be in the range of 48% of the total amount of active lithium.

In another type of lithium-alloy cell lithium is simply alloyed into the base metal, such as aluminium, or into a semi-metal, such as silicon, which is applied directly in the cell. In the case of aluminium, the reaction scheme is:

$$xLi+Al \rightarrow Li_xAl$$

In this case a loss is observed as the diffusion of lithium in the $\alpha$-phase of the lithium-aluminium alloy is so slow, that lithium therefrom is for practical purposes not released during discharge of the cell. Further, the above instability phenomena still exist and cause additional loss of active lithium.

Accordingly, there is a need for an efficient way of providing additional active lithium to compensate for capacity losses in lithium ion cells as well as in lithium-alloy cells. Such active lithium is provided entirely via the cathode.

A number of patents describes approaches to compensate for the loss of active lithium:

U.S. Pat. No. 4,507,371 and U.S. Pat. No. 5,240,794, both to Technology Finance Corporation, describe lithium manganese oxides with excess lithium compared to $LiMn_2O_4$. '371 describes cathode structures of $Li_{1+x}Mn_2O_4$, $x>0$, whereas '794 describes a range of compositions within the compositional area defined by its corner compositions $Li_{14}Mn_5O_{12}$, $Li_2Mn_3O_4$, $LiMn_3O_4$ and $Li_4Mn_5O_{12}$.

U.S. Pat. No. 5,370,710 to Sony describes an approach to alleviating the capacity loss by doping a $LiMn_2O_4$ cathode material with an additional amount of lithium to obtain a compound $Li_{1+x}Mn_2O_4$ either by chemical or electrochemical means. A specific chemical doping method is described in U.S. Pat. No. 5,266,299 to Bell Communication Research, which claims doping of $LiMn_2O_4$ or $\lambda\text{-}MnO_2$ with LiI.

Although a number of approaches exists for the introduction of additional active lithium into rechargeable lithium cells, there is still a need for cathodes of such cells, which provide high capacity, safe and simple processing and which are low cost compounds.

More specifically, an objective of the present invention is to provide rechargeable lithium cells of the lithium-ion or the lithium-alloy type, in which the cathode material has a high capacity, and which can be used for alleviation of the consequences of the capacity loss as well as for subsequent charge-discharge cycling.

The cathode material should display a higher capacity than the capacities of the traditional cathode materials $LiMn_2O_4$, $LiCoO_2$, $LiNiO_2$ and $LiNi_xCo_{1-x}O_2$, $0<x<1$. According to the invention, however, there is no need for the full capacity of the cathode material to be rechargeable. In fact, as the cathode capacity is used for loss compensation as well as for cycling, the fraction used for loss compensation might as well be non-rechargeable. Therefore, whereas the first charge capacity of the cathode material should be higher than for the above prior art materials, the rechargeable capacity does not need to be higher. On the other hand, high rechargeable capacity will not reduce the cell performance.

This objective is accomplished by electrochemical cells, the cathode structure of which comprises a lithium cobalt manganese oxide of a tetragonal structure.

Cobalt manganese oxides and related materials are described in/by:

U.S. Pat. No. 5,084,366 to Matsushita Electric Industrial Co., Ltd., describes a secondary cell, the cathode of which is selected from a group of transition metal oxides including lithium cobalt manganese oxide spinel structures. Such compounds, however, have in their discharged state a chemical composition of $Li_xCo_yMn_{2-y}O_4$, $0.85 \leq x \leq 1.15$ and $0.02 \leq y \leq 0.3$. In their charged state, x reaches a value of 0.7, i.e. the patent does not describe of any compound $Li_2Co_yMn_{2-y}O_4$, $0<y<0.6$ or its use for compensation of capacity losses.

U.S. Pat. No. 5,506,078 to National Research Council of Canada describes a method of forming a spinel-related $\lambda\text{-}Li_{2-x}Mn_2O_4$ upon electrochemical deintercalation of lithium from an orthorhombic $LiMnO_2$ of space group Pnmm and unit cell a=4.572 Å, b=5.757 Å and c=2.805 Å. Although the patent describes the use of spinel-related structures of composition $Li_2M_2O_4$, M being a transition metal, it does not describe cobalt manganese oxides such as $Li_2Co_yMn_{2-y}O_4$, $0<y<0.6$ and the simple handling thereof.

Sánchez et al (J. Electrochem. Soc. 144 (1997) 1939), Guohua et al (J. Electrochem. Soc. 143 (1996) 178) and Liu et al (J. Electrochem. Soc. 143 (1996) 879), all describe lithium cobalt manganese oxides. The compounds described by these groups, however, are included in the compositional range of spinels $Li_xCo_yMn_{2-y}O_{4+\delta}$, $0 \leq x \leq 1$, $0.04 \leq y \leq 0.33$, $0 \leq \delta \leq 0.5$. Thus they do not disclose any information on $Li_2Co_yMn_{2-y}O_4$, $0<y<0.6$ and it use for the compensation for irreversible losses.

Stoyanova et al (Solid State Ionics 73 (1994) 233–240) describe $LiCo_yMn_{1-y}O_2$, $0<y<0.3$ with tetragonal symmetry. The paper further describes the acid delithiation of such compounds, and the subsequent application of the delithiated structures as cathode materials in lithium-metal cells. Thus the concept of the lithium-metal cells which are described differs significantly from the concept of the lithium-ion or lithium alloy cells of the present invention; the cells prepared by Stoyanova et al are assembled in their charged state, while the cells of the present invention are assembled in their discharged state.

Further, as the cells of Stoyanova et al are of the lithium metal type, the paper does not describe the concept of loss compensation.

EP-A-0 778 629 (Kerr-McGee Chemical Corporation) describes the production of compounds of the formula $Li_2M_bMn_{2-b}O_4$ where M is a metal other than Mn (advantageously Al, Ti, V, Cr, Fe, Co, Ni, Cu). Broadly b can range from 0.001 to 1.999 but when M is Co, b is stated to be advantageously less than 0.2. The materials are suggested as replacements for $Li_2Mn_2O_4$ in secondary Li ion electrochemical cells. The general disclosure of the patent is quite broad but a product which was partially $Li_2Co_{0.2}Mn_{1.8}O_4$ was produced from $LiCo_{0.2}Mn_{1.8}O_4$ by reduction/reaction with $LiOH.H_2O$.

DETAILED DESCRIPTION OF THE INVENTION

The present invention relates to electrochemical cells of the lithium-ion and lithium-alloy type, the cathode structure of which comprises $Li_2Co_yMn_{2-y}O_4$, $0<y<0.6$, which has a tetragonal structure derived from the cubic spinel structure.

According to one aspect, the present invention provides a rechargeable electrochemical cell comprising a negative electrode, an electrolyte and a positive electrode, characterised in that the positive electrode structure comprises lithium cobalt manganese oxide of the composition $Li_2Co_yMn_{2-y}O_4$ where $0<y<0.6$, and one or more rechargeable compounds selected from $LiMn_2O_4$, $LiCoO_2$, $LiNiO_2$ and $LiNi_xCo_{1-x}O_2$, $0<x<1$, preferably $LiMn_2O_4$.

According to another aspect the present invention provides a rechargeable electrochemical cell comprising a negative electrode, an electrolyte and a positive electrode, characterised in that the positive electrode structure thereof comprises lithium cobalt manganese oxide of the composition $Li_2Co_yMn_{2-y}O_4$ where $0<y<0.6$ with an air and moisture insensitive tetragonal structure.

Such cells are preferably based on a non-aqueous electrolyte comprising one or more lithium salts and an anode which comprises an electrochemically active carbon structure selected from the group of graphite, coke and carbon blacks or an alloy based on a metal, in particular aluminium, or based on a semi-metal, in particular silicon, or based on a metal oxide, in particular tin oxide.

Upon first charge of the cell, $Li_2Co_yMn_{2-y}O_4$, $0<y<0.6$ is able to release a significantly higher amount of lithium compared to the traditionally applied cathode materials. During such initial charging, the structure is changed into a cubic spinel structure, which is comparable to $LiMn_2O_4$ in terms of structure and rechargeable capacity. The lithium cobalt manganese oxide simply provides additional non-rechargeable capacity.

The structures of complementary composition, $Li_2Co_yMn_{2-y}O_4$, $y>0.6$, have a cubic structure ($0.6<y<1.6$) or a trigonal structure ($y>1.6$). None of these compounds display the spinel structure at any state of charge, and they have cycling properties, which are inferior the those of the spinel or spinel phases.

The cobalt-free material $Li_2Mn_2O_4$ display structural properties similar to $Li_2Co_yMn_{2-y}O_4$, $0<y<0.6$, i.e. it has a tetragonal structure, which is changed into a cubic spinel structure upon deintercalation of Li. However, whereas $Li_2Co_yMn_{2-y}O_4$, $0<y<0.6$ is stable under ambient conditions, $Li_2Mn_2O_4$ is unstable and the handling thereof requires complex processing, which is not suited for large scale production.

According to the invention the first charge capacity and rechargeable capacity of the cathode material should match the total capacity of the anode and the reversible capacity, respectively.

In one embodiment of the invention the electrochemical cell has a cathode structure, which as the only active compound comprises $Li_2Co_yMn_{2-y}O_4$, $0<y<0.6$.

In this case optimal matching is obtained from a variation of the cobalt-content of $Li_2Co_yMn_{2-y}O_4$, $0<y<0.6$. At low y-values, i.e. at low degrees of cobalt-substitution, compounds are obtained which have an initial capacity which is approximately double the rechargeable capacity. At higher y-values compounds are obtained, which have more than double initial capacity compared to rechargeable capacity.

As all of the compounds $Li_2Co_yMn_{2-y}O_4$, $0<y<0.6$ display high irreversible capacities, cathode structures comprising the lithium cobalt manganese oxide as the only active material are especially adapted to those anode configurations, which display high irreversible loss, traditionally anode structures based on cokes, carbon blacks and alloys like the lithium-tin system.

Table I below summarises the theoretical and actually measured initial capacities of the cathode materials of the present invention. The specific capacities (mAh/g) are measured in half cells with lithium metal negative electrodes at low rate (C/50). They are determined from the amount of charge passed across the cells in the first charge half cycle and the mass of the active material in the cathodes. The initial capacities are obtained upon first charge to 4.7V vs. Li/Li$^+$.

TABLE I

Specific first charge capacities (mAh/g) of cathode materials.

| Compound | First Charge Capacity (mAh/g) | |
|---|---|---|
| | Theoretical | Actual |
| $Li_2Co_{0.1}Mn_{1.9}O_4$ | 285 | 213 |
| $Li_2Co_{0.3}Mn_{1.7}O_4$ | 283 | 219 |
| $Li_2Co_{0.4}Mn_{1.6}O_4$ | 283 | 227 |
| $Li_2Co_{0.5}Mn_{1.5}O_4$ | 282 | 234 |
| $Li_2Co_{0.6}Mn_{1.4}O_4$ | 282 | 237 |

As can be seen from Table I, the first charge capacities of the cathode materials used according to the present invention are significantly higher than the capacity of any of the materials $LiMn_2O_4$, $LiCoO_2$, $LiNiO_2$ and $LiNi_xCo_{1-x}O_2$, $0<x<1$.

Table II below summarises actually measured rechargeable capacities of the materials of the present invention. The specific capacities (mAh/g) are measured in half cells with lithium metal negative electrodes at low rate (C/50). They are determined from the amount of charge passed across the cells in the first discharge half cycle and the mass of the active material in the cathodes. The reversible capacities were measured upon cycling in the potential range 3.5–4.3 V vs. Li/Li$^+$.

TABLE II

Specific reversible capacities (mAh/g) of cathode materials.

| Compound | Reversible Capacity (mAh/g) |
|---|---|
| $Li_2Co_{0.1}Mn_{1.9}O_4$ | 107 |
| $Li_2Co_{0.3}Mn_{1.7}O_4$ | 100 |
| $Li_2Co_{0.4}Mn_{1.6}O_4$ | 94 |
| $Li_2Co_{0.5}Mn_{1.5}O_4$ | 88 |
| $Li_2Co_{0.6}Mn_{1.4}O_4$ | 89 |

As can be seen from Table II, the cathode materials of the present invention display rechargeable capacities, which are lower than the 122 mAh/g of $LiMn_2O_4$ but are still applicable for use in practical electrochemical cells.

In one embodiment of the invention the cathode material is $Li_2Co_yMn_{2-y}O_4$, $0.1<y<0.5$, preferably $Li_2Co_yMn_{2-y}O_4$, $0.3<y<0.45$, more preferably the cathode material is $Li_2Co_{0.4}Mn_{1.6}O_4$.

In a preferred embodiment of the invention the cathode composition comprises rechargeable material in an amount corresponding to 20–98% by weight of the complete electrode structure, respectively, preferably 50–98%, more preferably 70–95% and even more preferably 80–95% by weight of the complete electrode structure.

In an alternative embodiment of the invention the electrochemical cell has a cathode structure, which in addition to $Li_2Co_yMn_{2-y}O_4$, $0<y<0.6$ comprises one or more rechargeable compounds selected from the group of $LiMn_2O_4$, $LiCoO_2$, $LiNiO_2$ and $LiNi_xCo_{1-x}O_2$, $0<x<1$. In a preferred embodiment the rechargeable material is $LiMn_2O_4$.

Such cathode structures are especially applicable in those cases, where a relatively low irreversible loss at the anode should be compensated. In this case the capacity matching is achieved by the choice of composition in terms of cobalt manganese oxide and rechargeable materials. Thus composite structures can be produced, which match a low irreversible loss of e.g. 20%, typical for a graphite based anode. In such case, using $Li_2Co_{0.4}Mn_{1.6}O_4$ as representative of $Li_2Co_yMn_{2-y}O_4$, $0<y<0.6$ and $LiMn_2O_4$ as rechargeable material, a cathode composition of $Li_2Co_{0.4}Mn_{1.6}O_4$:$LiMn_2O_4$=1:3.59 by weight should be applied. Such composition matches the 20% irreversible loss at the anode, as it—per gram of $Li_2Co_{0.4}Mn_{1.6}O_4$—provides an irreversible capacity of 227−94 mAh=133 mAh and a rechargeable capacity of 94+3.59×122 mAh=532 mAh.

Table III below summarises the initial (first charge) capacities of composite cathode structures comprising mixtures corresponding to 1:3.59 combinations (by weight) of the indicated cathode material and $LiMn_2O_4$. Table III further compares the initial capacities of composite cathode structures to the weighted sum of components as based on their individual capacities (Table I) and based on an initial capacity of $LiMn_2O_4$ of 122 mAh/g.

The 1:3.59 combination by charge used in table III and below in table IV and example 3 and 4 illustrate the preferred cathode composition in the case of approximately 20% irreversible loss at the anode. In such case the reversible and irreversible capacities of the cathode would match the reversible capacity and irreversible loss at the anode. The use of the 1:3.59 by weight combination should not be considered as any limitation on the scope of the invention.

The capacities were measured in half cells with lithium metal negative electrodes at low rate (C/50). They are determined from the amount of charge passed through the cells in the first half cycle and the total amount of oxide in the cathodes structures, i.e. they are specific initial capacities (mAh/g) for the 1:3.59 by weight composite of $Li_2Co_yMn_{2-y}O_4$, $0<y<0.6$ and $LiMn_2O_4$. The initial capacities are obtained upon first charge to 4.7V vs. Li/Li$^+$.

TABLE III

Specific first charge capacities (mAh/g) of mixed oxide cathode structures.

| Cathode composition (by weight) | First Charge Capacity (mAh/g) | |
|---|---|---|
| | Actual | Weighted sum |
| $Li_2Co_{0.1}Mn_{1.9}O_4$ + 3.59 $LiMn_2O_4$ | 139 | 142 |
| $Li_2Co_{0.3}Mn_{1.7}O_4$ + 3.59 $LiMn_2O_4$ | 144 | 143 |
| $Li_2Co_{0.4}Mn_{1.6}O_4$ + 3.59 $LiMn_2O_4$ | 149 | 145 |
| $Li_2Co_{0.5}Mn_{1.5}O_4$ + 3.59 $LiMn_2O_4$ | 140 | 146 |
| $Li_2Co_{0.6}Mn_{1.4}O_4$ + 3.59 $LiMn_2O_4$ | 149 | 147 |

As can be seen from Table III, the first charge capacities of the composite cathode structures of cathode materials of the present invention and $LiMn_2O_4$ are significantly higher than the capacity of pure $LiMn_2O_4$. As can further be seen from Table III, the actually measured initial capacities of the composite cathode structures are in accordance with the sum of initial capacities of the individual components, weighted by their relative abundance.

Table IV below summarises rechargeable (reversible) capacities of composite cathode structures comprising mixtures corresponding to 1:3.59 combinations (by weight) of the indicated cathode material and $LiMn_2O_4$. Table IV further compares the rechargeable capacities of composite cathode structures to the weighted sum of components as based on their individual capacities (Table II) and based on an rechargeable capacity of $LiMn_2O_4$ of 122 mAh/g.

The specific capacities (mAh/g) are measured in half cells with lithium metal negative electrodes at low rate (C/50). They are determined from the amount of charge passed across the cells in the first discharge half cycle and the mass of the active material in the cathodes, i.e. they are specific reversible capacities (mAh/g) for the 1:3.59 by weight composite of $Li_2Co_yMn_{2-y}O_4$, $0<y<0.6$ and $LiMn_2O_4$. The reversible capacities were measured upon cycling in the potential range 3.5–4.3 V (vs. $Li/Li^+$).

TABLE IV

Specific reversible capacities (mAh/g) of mixed oxide cathode structures.

| Cathode composition (by weight) | Actual | Reversible specific Capacity (mAh/g) Weighted sum |
|---|---|---|
| $Li_2Co_{0.1}Mn_{1.9}O_4$ + 3.59 $LiMn_2O_4$ | 118 | 119 |
| $Li_2Co_{0.3}Mn_{1.7}O_4$ + 3.59 $LiMn_2O_4$ | 112 | 117 |
| $Li_2Co_{0.4}Mn_{1.6}O_4$ + 3.59 $LiMn_2O_4$ | 116 | 116 |
| $Li_2Co_{0.5}Mn_{1.5}O_4$ + 3.59 $LiMn_2O_4$ | 113 | 115 |
| $Li_2Co_{0.6}Mn_{1.4}O_4$ + 3.59 $LiMn_2O_4$ | 112 | 115 |

As can be seen from Table IV, the reversible capacities of the composite cathode structures of cathode materials used according to the present invention and $LiMn_2O_4$ are only slightly lower than the capacity of pure $LiMn_2O_4$. As can further be seen from Table IV, the actually measured rechargeable capacities of the composite cathode structures are in accordance with the sum of rechargeable capacities of the individual components, weighted by their relative abundance.

In a preferred embodiment of the invention the negative electrode consists of a graphite, a coke, a carbon black or a lithium alloy.

The cathode composition may comprise $Li_2Co_yMn_{2-y}O_4$, $0<y<0.6$ and one or more compounds selected from the group of $LiMn_2O_4$, $LiCoO_2$, $LiNiO_2$ and $LiNi_xCo_{1-x}O_2$, $0<x<1$ in amounts corresponding to 20–98% and 1–79% by weight of the complete electrode structure, respectively, preferably 40–98% and 1–59% by weight of the complete electrode structure, respectively, more preferably 50–80% and 10–40% by weight of the complete electrode structure, respectively, even more preferably 65–80% and 10–25% by weight of the complete electrode structure, respectively. This structure is particularly applicable in the case where the negative electrode is of coke and/or carbon black.

The cathode composition may alternatively comprise $Li_2Co_yMn_{2-y}O_4$, $0<y<0.6$ and one or more compounds selected from the group of $LiMn_2O_4$, $LiCoO_2$, $LiNiO_2$ and $LiNi_xCo_{1-x}O_2$, $0<x<1$ in amounts corresponding to 1–79% and 20–98% by weight of the complete electrode structure, respectively, preferably 1–59% and 40–98% by weight of the complete electrode structure, respectively, more preferably 10–50% and 40–80% by weight of the complete electrode structure, respectively, even more preferably 15–30% and 60–75% by weight of the complete electrode structure, respectively. This cathode composition is particularly applicable in the case where the negative electrode is graphite.

In a preferred embodiment of the invention the electrolyte of the electrochemical cell comprises one or more non-aqueous solvents selected from the group of ethylene carbonate, propylene carbonate, dimethyl carbonate, diethyl carbonate, γ-valerolactone, γ-butyrolactone and one or more salts selected from the group of $LiCF_3SO_3$, $LiAsF_6$, $LiBF_4$, $LiPF_6$ and $LiClO_4$.

A particular advantage of the present invention is that the cathode material $Li_2Co_yMn_{2-y}O_4$, $0<y<0.6$, can be provided in air and moisture insensitive tetragonal form. The material of formula $Li_2Co_{0.2}Mn_{1.8}O_4$ described in EP-A-0 778 629 referred to above is prepared by reaction of $LiCo_{0.2}Mn_{1.8}O_4$ with $LiOH.H_2O$ and hydrazine as a reducing agent in liquid medium and the product is stated to be sensitive to oxygen and water in the air and, for this reason, is to be handled in an inert atmosphere. It has surprisingly been found that use of an alternative synthesis procedure provides $Li_2Co_yMn_{2-y}O_4$, $0<y<0.6$, in tetragonal form which is air and moisture insensitive.

In order to ensure air and moisture insensitivity, $Li_2Co_yMn_{2-y}O_4$, $0<y<0.6$ may be prepared by sintering a mixture of at least two solid compounds which together contain lithium, manganese and cobalt in the required ratio. These compounds may be a lithium manganese compound and a lithium cobalt compound although separate lithium, manganese and cobalt compounds or compounds containing any combination of these metals may be used. In principle the solid compound can be any oxide of lithium and/or manganese and/or cobalt or any compound which decomposes into such an oxide on sintering. Examples of compounds which decompose into the corresponding oxide on sintering are hydroxides, carbonates, acetates, nitrates, etc. A particularly advantageous combination of solid compounds is lithium manganese oxide ($LiMnO_2$) and lithium cobalt oxide ($LiCoO_2$).

Sintering can be carried out at any suitable elevated temperature for formation of the $Li_2Co_yMn_{2-y}O_4$, $0<y<0.6$, preferably 500 to 900° C., more preferably 600 to 800° C., most preferably about 700° C. Sintering may, for example, be carried out in airor under an inert atmosphere such as nitrogen. The solid compounds can advantageously be mixed initially by grinding and the product after sintering can be ground.

EXAMPLES

Example 1

Figure 1:
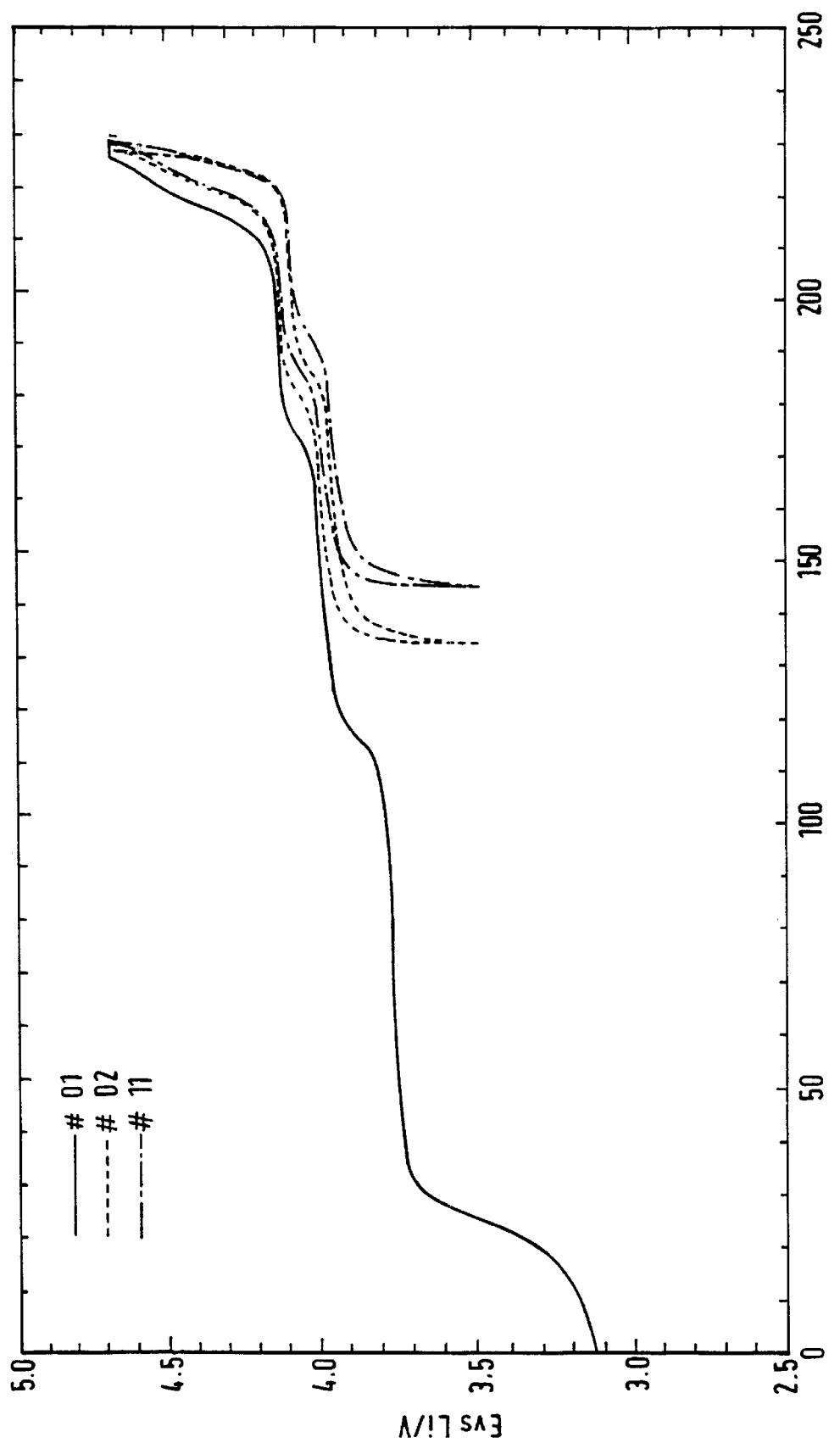
FIG. 1 shows the voltage-capacity relation for a $Li/Li_2Co_{0.4}Mn_{1.6}O_4$ couple during first charge and subsequent discharge-charge cycling.

$Li_2Co_{0.4}Mn_{1.6}O_4$ ($Li_2Co_yMn_{2-y}O_4$, y=0.4) was synthesised from orthorhombic-$Li_{1.04}MnO_2$ (SEDEMA, Belgium) and $LiCoO_2$ (Union Minière, Belgium), following a two-step procedure. It should be noted that the second step in the procedure is not essential for the production of $Li_2Co_{0.4}Mn_{1.6}O_4$ but is included to give a finer product. In the first step, the powders were mixed by grinding and subsequently annealed at 770° C. for 24 h and cooled to 300° C. in 1.5 h. In the second step, the product was reground and the pelletized material was treated at 700° C. for 12 h. The final product was the correct tetragonal phase with a small amount of orthorhombic-$LiMnO_2$ and cubic $LiCo_yMn_{1-y}O_2$, $0.3<y$ as impurities. The final product was a dark brown powder with shiny particles. The chemical composition of the material was confirmed by chemical analysis. The theoretical capacity of this material is 284 mAh/g when all lithium is extracted.

Example 2

Electrodes containing 69–79% by weight of $Li_2Co_{0.4}Mn_{1.6}O_4$ (made as described in example 1), 4.8–5.2% polytetrafluorethylene (Teflon) and 16–26% Shawinigan carbon black, were made by mixing the oxide and carbon in a mortar with acetone. After drying, polytetrafluoroethylene (Teflon) powder was added followed by grinding for 5–10 minutes, during which a plastic material formed. Electrodes were made from this material by rolling until the thickness of the film reaches 70–100 µm.

10–17 mg pellets were punched from the film, and dried under vacuum at 120–130° C. for 14 h. Such electrodes were cycled in spring loaded lithium metal based test cells, separated from the counter lithium electrode sheet by a porous Celgard separator soaked in 1M $LiPF_6$ in ethylene carbonate/dimethyl carbonate electrolyte.

Cells were tested under galvanostatic charge conditions to fixed voltage limits, optionally followed by a period of potentiostatic charging at the upper voltage in order to bring the electrode in a reproducible state before each discharge. The specific capacity was calculated numerically from the voltage/time relationship and the amount of oxide in the electrode. The voltage was measured with lithium as the reference. On the initial charge to 4.7 V the capacity was 227 mAh/g. Cycling between 3.5 and 4.3V provided approx. 94 mAh/g. FIG. 1 shows the voltage-capacity relation for a $Li/Li_2Co_{0.4}Mn_{1.6}O_4$ couple.

Example 3

Composite cathode structures of $Li_2Co_{0.4}Mn_{1.6}O_4$ (made as described in example 1) and $LiMn_2O_4$-cathodes were made in a 1:3.59 by weight ratio. Such composition corresponds to a rechargeable capacity of 80% of the total initial capacity, i.e. an irreversible loss of 20%.

Electrodes and cells were made as described in example 2, using the same electrolyte and lithium as the counter electrode. The capacity obtained from the first charge (149 mAh/g) corresponded to the weighted first charge capacities of the two materials (145 mAh/g). In subsequent cycles, the capacity was 116 mAh/g. In fact, the reversible capacity of the composite was in accordance with the weighted reversible capacity of the components (116 mAh/g).

Example 4

Composite $Li_2Co_{0.4}Mn_{1.6}O_4/LiMn_2O_4$ electrodes were made by mixing 85% by weight of mixed oxide (1:3.59 by weight), 10% by weight of Shawinigan Black and 5% by weight of polymer binder. The mixture was treated in a ball mill for 17 hours until a uniform material of ink-like consistency was formed. Electrodes were made by screen printing of this "ink" onto aluminum current collectors. Subsequently, excess solvent was evaporated and the electrodes were dried at about 50° C. for 16 h.

A graphite anode was prepared in a similar manner by milling a mixture of 86% by weight of graphite KS15 (Lonza), 10% by weight of Shawinigan Black as conductive carbon diluent and 4% by weight of EPDM as binder to form a material of ink-like consistency. The anode "ink" was screen printed onto copper foil current collectors.

Cells were assembled as described in example 2 substituting the carbon anode foil for lithium foil. The same electrolyte configuration was employed.

During the first charge of the cell a specific capacity of 142 mAh/g was extracted from the composite cathode. During subsequent cycling, a constant capacity of 111 mAh/g was retained.

What is claimed is:

1. A rechargeable electrochemical cell comprising a negative electrode, an electrolyte and a positive electrode comprising 20–98%, based on the total weight of the complete electrode structure, of lithium cobalt manganese oxide of the composition $Li_2Co_yMn_{2-y}O_4$, where $0<y<0.6$, and 1–79%, based on the total weight of the complete electrode structure, of one or more rechargeable compounds selected from the group consisting of $LiMn_2O_4$, $LiCoO_2$, $LiNiO_2$ and $LiNi_xCo_{1-x}O_2$, $0<x<1$.

2. The rechargeable electrochemical cell according to claim 1 wherein the lithium cobalt manganese oxide has a tetragonal structure which is not sensitive to air and moisture.

3. The rechargeable electrochemical cell according to claim 2 wherein the lithium cobalt manganese oxide has been prepared by a method which comprises sintering a mixture of at least two solid compounds which together contain lithium, manganese and cobalt.

4. The rechargeable electrochemical cell according to claim 3 wherein the at least two solid compounds are a lithium manganese compound and a lithium cobalt compound.

5. The rechargeable electrochemical cell according to claim 3 wherein the mixture is sintered in air at a temperature in the range 500 to 900° C.

6. The rechargeable electrochemical cell according to claim 3 wherein the mixture is sintered in air at a temperature in the range of 600 to 800° C.

7. The rechargeable electrochemical cell according to claim 3 wherein the mixture is sintered in air at a temperature of about 700° C.

8. The rechargeable electrochemical cell according to claim 1, wherein the lithium cobalt manganese oxide is of the composition $Li_2Co_yMn_{2-y}O_4$, $0.1<y<0.5$.

9. The rechargeable electrochemical cell according to claim 1, wherein the negative electrode consists of a metal capable of alloying with lithium.

10. The rechargeable electrochemical cell according to claim 9, wherein the negative electrode consisting of a metal capable of alloying with lithium is aluminum.

11. The rechargeable electrochemical cell according to claim 1, wherein the negative electrode consists of graphite, a coke, a carbon black, or a combination thereof.

12. The rechargeable electrochemical cell according to claim 1, wherein the electrolyte comprises one or more non-aqueous solvents is selected from the group consisting of ethylene carbonate, propylene carbonate, dimethyl carbonate, diethyl carbonate, γ-valerolactone, and γ-butyrolactone and one or more salts is selected from the group consisting of $LiCF_3SO_3$, $LiAsF_6$, $LiBF_4$, $LiPF_6$ and $LiClO_4$.

13. The rechargeable electrochemical cell according to claim 1, wherein the negative electrode consists of a coke, a carbon black, or a combination thereof.

14. The rechargeable electrochemical cell according to claim 1, wherein the lithium cobalt manganese oxide $Li_2Co_yMn_{2-y}O_4$, $0<y<0.6$ is present in an amount from 40–98%, based on the weight of the complete electrode structure and the one or more compounds selected from the group consisting of $LiMn_2O_4$, $LiCoO_2$, $LiNiO_2$ and $LiNi_xCo_{1-x}O_2$, $0<x<1$ are present in the cathode structure in amounts of 1–59% based on the total weight of the complete electrode structure.

15. The rechargeable electrochemical cell according to claim 1, wherein the lithium cobalt manganese oxide $Li_2Co_yMn_{2-y}O_4$, $0<y<0.6$ is present in an amount from 50–80%, based on the weight of the complete electrode structure and the one or more compounds selected from the group consisting of $LiMn_2O_4$, $LiCoO_2$, $LiNiO_2$ and $LiNi_xCo_{1-x}O_2$, 0<x<1 are present in the cathode structure in amounts 10–40% based on the total weight of the complete electrode structure.

16. The rechargeable electrochemical cell according to claim 1, wherein the lithium cobalt manganese oxide $Li_2Co_yMn_{2-y}O_4$, 0<y<0.6 is present in an amount of 65–80%, based on the total weight of the complete electrode structure and the one or more compounds selected from the group consisting of $LiMn_2O_4$, $LiCoO_2$, $LiNiO_2$ and $LiNi_xCo_{1-x}O_2$, 0<x<1 are present in the cathode structure in amounts of 10–25% based on the total weight of the complete electrode structure.

17. The rechargeable electrochemical cell according to claim 1, wherein the one or more compounds selected from the group consisting of $LiMn_2O_4$, $LiCoO_2$, $LiNiO_2$ and $LiNi_xCo_{1-x}O_2$, 0<x<1 is $LiMn_2O_4$.

18. The rechargeable electrochemical cell according to claim 1, wherein the lithium cobalt manganese oxide is of the composition $Li_2Co_yMn_{2-y}O_4$, 0.3<y<0.45.

19. The rechargeable electrochemical cell according to claim 1, wherein the lithium cobalt manganese oxide is of the composition $Li_2Co_yMn_{2-y}O_4$, y=0.4.

20. The rechargeable electrochemical cell according to claim 1, wherein the negative electrode consists of a semi-metal capable of alloying with lithium.

21. The rechargeable electrochemical cell according to claim 20, wherein the negative electrode consisting of a semi-metal capable of alloying with lithium is silicon.

22. The rechargeable electrochemical cell according to claim 1, wherein the negative electrode consists of a metal oxide, which can react with lithium to form its corresponding metal capable of alloying with lithium.

23. The rechargeable electrochemical cell according to claim 22, wherein the negative electrode consisting of a metal oxide, which can react with lithium to form its corresponding metal capable of alloying with lithium is tin oxide.

24. The rechargeable electrochemical cell according to claim 1, wherein the negative electrode consists of a carbon structure capable of intercalating lithium.

25. A rechargeable electrochemical cell comprising a negative electrode, and electrolyte and a positive electrode comprising 1–79%, based on the total weight of the complete electrode structure, of lithium cobalt manganese oxide of the composition $Li_2Co_yMn_{2-y}O_4$, where 0<y<0.6, and 20–98%, based on the total weight of the complete electrode structure, of one or more rechargeable compounds selected from the group consisting of $LiMn_2O_4$, $LiCoO_2$, $LiNiO_2$ and $LiNi_xCo_{1-x}O_2$, 0<x<1.

26. The rechargeable electrochemical cell according to claim 25, wherein the negative electrode consists of graphite.

27. The rechargeable electrochemical cell according to claim 25, wherein the lithium cobalt manganese oxide $Li_2Co_yMn_{2-y}O_4$, 0<y<0.6 is present in the cathode structure in an amount from 1–59%, based on the weight of the complete electrode structure and the one or more compounds selected from the group consisting of $LiMn_2O_4$, $LiCoO_2$, $LiNiO_2$ and $LiNi_xCo_{1-x}O_2$, 0<x<1, are present in the cathode structure in amounts from 40–98%, based on the weight of the complete electrode structure.

28. The rechargeable electrochemical cell according to claim 25, wherein the lithium cobalt manganese oxide $Li_2Co_yMn_{2-y}O_4$, 0<y<0.6 is present in the cathode structure in an amount from 10–50%, based on the weight of the complete electrode structure and the one or more compounds selected from the group consisting of $LiMn_2O_4$, $LiCoO_2$, $LiNiO_2$ and $LiNi_xCo_{1-x}O_2$, 0<x<1, are present in the cathode structure in amounts from 20–80% based on the total weight of the complete electrode structure.

29. The rechargeable electrochemical cell according to claim 25, wherein the lithium cobalt manganese oxide $Li_2Co_yMn_{2-y}O_4$, 0<y<0.6 is present in the cathode structure in an amount from 15–30%, based on the weight of the complete electrode structure and the one or more compounds selected from the group consisting of $LiMn_2O_4$, $LiCoO_2$, $LiNiO_2$ and $LiNi_xCo_{1-x}O_2$, 0<x<1, are present in the cathode structure in amounts from 60–75% based on the total weight of the complete electrode structure.

30. A rechargeable electrochemical cell comprising a negative electrode, an electrolyte and a positive electrode comprising lithium cobalt manganese oxide of the composition $Li_2Co_yMn_{2-y}O_4$ where 0<y<0.6 with a tetragonal structure which is not sensitive to air and moisture wherein the lithium cobalt manganese oxide has been prepared by a method which comprises sintering a mixture of at least two solid compounds wherein the at least two solid compounds are a lithium manganese compound and a lithium cobalt compound.

31. The rechargeable electrochemical cell according to claim 30, wherein the mixture is sintered in air at a temperature in the range 500 to 900° C.

32. The rechargeable electrochemical cell according to claim 30 wherein the lithium cobalt manganese oxide is the only active compound in the positive electrode.

33. The rechargeable electrochemical cell according to claim 32, wherein the lithium cobalt manganese oxide is present in the cathode structure in an amount of 20–98% based on the weight of the complete electrode structure.

34. The rechargeable electrochemical cell according to claim 32, wherein the lithium cobalt manganese oxide is present in the cathode structure in an amount of 50–98% based on the total weight of the complete electrode structure.

35. The rechargeable electrochemical cell according to claim 32, wherein the lithium cobalt manganese oxide is present in the cathode structure in an amount of 70–95% based on the total weight of the complete electrode structure.

36. The rechargeable electrochemical cell according to claim 32, wherein the lithium cobalt manganese oxide is present in the cathode structure in an amount of 80–95% based on the total weight of the complete electrode structure.

37. The rechargeable electrochemical cell according to claim 30, wherein the mixture is sintered in air at a temperature in the range 600 to 800° C.

38. The rechargeable electrochemical cell according to claim 30, wherein the mixture is sintered in air at a temperature of about 700° C.

* * * * *